(12) United States Patent
Morozumi

(10) Patent No.: US 9,385,573 B2
(45) Date of Patent: Jul. 5, 2016

(54) ROTOR OF COMPRESSOR MOTOR HAVING A BALANCE WEIGHT STABLY POSITIONED

(75) Inventor: Naoya Morozumi, Kanagawa (JP)

(73) Assignee: FUJITSU GENERAL LIMITED, Kanagawa (JP)

(*) Notice: Subject to any disclaimer, the term of this patent is extended or adjusted under 35 U.S.C. 154(b) by 1020 days.

(21) Appl. No.: 13/262,447

(22) PCT Filed: Mar. 25, 2010

(86) PCT No.: PCT/JP2010/055250
§ 371 (c)(1),
(2), (4) Date: Dec. 28, 2011

(87) PCT Pub. No.: WO2010/113765
PCT Pub. Date: Oct. 7, 2010

(65) Prior Publication Data
US 2012/0098359 A1    Apr. 26, 2012

(30) Foreign Application Priority Data

Mar. 31, 2009    (JP) .................................. 2009-086485

(51) Int. Cl.
*H02K 1/34* (2006.01)
*H02K 7/04* (2006.01)
(Continued)

(52) U.S. Cl.
CPC . *H02K 7/04* (2013.01); *F04B 35/04* (2013.01); *F04C 23/008* (2013.01); *F04C 29/0085* (2013.01); *F04C 2230/605* (2013.01); *H02K 1/276* (2013.01); *H02K 7/14* (2013.01)

(58) Field of Classification Search
CPC .......... H02K 15/165; H02K 7/04; F16B 5/04; F16B 5/045; F16B 5/025; F16B 5/0024; F16B 5/0068; F16B 5/0004; F16B 23/0046; F16B 19/04

USPC ....................... 310/51, 81, 216.117
See application file for complete search history.

(56) References Cited

U.S. PATENT DOCUMENTS 4,578,853 A * 4/1986 Wurth ............................. 29/598
7,393,191 B2   7/2008 Morozumi et al.
(Continued)

FOREIGN PATENT DOCUMENTS

CN    2881019 Y    3/2007
CN    101110541 A *    1/2008    ............. H02K 15/16
(Continued)

OTHER PUBLICATIONS

Machine tranlation of JP 2001197693 A.*
(Continued)

*Primary Examiner* — Naishadh Desai
(74) *Attorney, Agent, or Firm* — McDermott Will & Emery LLP

(57) ABSTRACT

A rotor includes a rotor laminated steel plate (12), rotor end plates (16, 18) arranged on both end surfaces of the rotor laminated steel plate (12), and balance weights (20, 22) provided on the outer surfaces of the rotor end plates (16, 18), respectively. The rotor laminated steel plate (12) and the rotor end plates (16, 18) are provided with at least three axial through holes (24) that are equally spaced apart in the circumferential direction. The rotor laminated steel plate (12) and the rotor end plates (16, 18) are fixed by three rivets (26a, 26b, 26c) passing through the axial through holes (24), respectively. The balance weight (20) is fixed to the rotor end plate (16) by the two rivets (26a, 26b) of the three rivets.

1 Claim, 6 Drawing Sheets

(51) Int. Cl.
*F04B 35/04* (2006.01)
*F04C 23/00* (2006.01)
*F04C 29/00* (2006.01)
*H02K 1/27* (2006.01)
*H02K 7/14* (2006.01)

(56) References Cited

U.S. PATENT DOCUMENTS

| | | | |
|---|---|---|---|
| 8,659,195 B2 * | 2/2014 | Tanaka | 310/66 |
| 2002/0096893 A1 * | 7/2002 | Wu | 292/347 |
| 2003/0230948 A1 * | 12/2003 | Murakami et al. | 310/156.53 |
| 2008/0211340 A1 * | 9/2008 | Lee et al. | 310/217 |
| 2011/0000079 A1 * | 1/2011 | Fukumaru et al. | 29/598 |
| 2012/0007455 A1 * | 1/2012 | Tanaka | 310/66 |

FOREIGN PATENT DOCUMENTS

| | | | | |
|---|---|---|---|---|
| EP | 1246348 A2 * | 10/2002 | | H02K 21/46 |
| GB | 2018042 A * | 10/1979 | | H02K 1/18 |
| JP | 63-028250 | 2/1988 | | |
| JP | 63-083972 | 6/1988 | | |
| JP | 04-237891 | 8/1992 | | |
| JP | 05-328645 | 12/1993 | | |
| JP | 09-308152 | 11/1997 | | |
| JP | 2000-125492 | 4/2000 | | |
| JP | 2000-287424 | 10/2000 | | |
| JP | 2001197693 A * | 7/2001 | | H02K 1/27 |
| JP | 2004-278374 A | 10/2004 | | |
| JP | 2005-245148 | 9/2005 | | |
| JP | 2006-152838 | 6/2006 | | |
| WO | WO 2010113766 A1 * | 10/2010 | | F04B 39/00 |

OTHER PUBLICATIONS

Machine translation of CN 101110541 A.*
Office Action Chinese Patent Application No. 201080013334.2 dated Nov. 22, 2013.

* cited by examiner

ROTOR OF COMPRESSOR MOTOR HAVING A BALANCE WEIGHT STABLY POSITIONED

RELATED APPLICATIONS

This application is the U.S. National Phase under 35 U.S.C. §371 of International Application No. PCT/JP2010/055250, filed on Mar. 25, 2010, which in turn claims the benefit of Japanese Application No. 2009-086485, filed on Mar. 31, 2009, the disclosures of which Applications are incorporated by reference herein.

TECHNICAL FIELD

The present invention relates to a rotor of a compressor motor used in rotary compressors such as scroll compressors.

BACKGROUND ART

There has been known a rotor of a motor used in rotary compressors such as scroll compressors (see, for example, Patent Documents 1 to 5). A 4-pole rotor generally includes a rotor laminated steel plate, a permanent magnet arranged inside the rotor laminated steel plate to form four magnetic poles, rotor end plates located on both end surfaces of the rotor laminated steel plate, and balance weights that counteract centrifugal force acting on the eccentrically rotating part of the compression mechanism. The rotor laminated steel plate and the rotor end plates are fixed by four rivets, and the balance weights are fixed to the rotor end plates, respectively, by using two of the four rivets.

As 6-pole rotors efficient in reducing vibration and noise, there have been known rotors having a structure in which the rotor laminated steel plate and the rotor end plates are fixed by six rivets or three rivets (see, for example, Patent Document 5).

Patent Document 1: Japanese Patent Application Laid-open No. 2000-125492
Patent Document 2: Japanese Patent Application Laid-open No. 2000-287424
Patent Document 3: Japanese Patent Application Laid-open No. S63-28250
Patent Document 4: Japanese Patent Application Laid-open No. H4-237891
Patent Document 5: Japanese Patent Application Laid-open No. 2005-245148

DISCLOSURE OF INVENTION

Problem to be Solved by the Invention

As illustrated in FIG. 5, two balance weights on both end surfaces of a conventional rotor of a compressor motor need to be located at positions with a phase difference of 180° taking into account the balance when the rotor is rotating. Consider the case that a 6-pole rotor is fixed by three rivets spaced substantially 120° apart, and two balance weights 2a and 2b are fixed by two rivets 4 of the three rivets. In this case, although the balance weight 2a on one side can be provided with two rivet holes 6a on the right side where they are supposed to be, the balance weight 2a on the other side is necessitated to have rivet holes 6b at positions on the side opposite the right side. This becomes a necessity to increase the size of the balance weight to achieve a predetermined centrifugal force, resulting in a higher cost.

In view of this, the balance weight 2b on the other side may be fixed by a single rivet 8. In this case, however, when fixed by the rivet 8, the balance weight 2b rotates about the rivet 8, which makes it difficult to stably position the balance weight 2b.

As illustrated in FIG. 6, the balance weight 2b to be fixed by the single rivet 8 may be shaped in a cylinder to reduce the effect of rotation about the rivet 8. In this case, however, the cylinder has to be thick to ensure the necessary mass and may result in a higher cost because of the difficulty in press molding. Besides, when the rotor is rotating, resistance from surrounding refrigerant gas increases, and thereby the efficiency of the compressor decreases.

The present invention has been made to solve the above problems in the conventional technology and it is an object of the present invention to provide a rotor of a compressor motor at a low cost in which a balance weight is stably positioned.

Means for Solving Problem

To solve the problems and achieve the object mentioned above, according to the invention set forth in claim 1, a rotor of a compressor motor includes: a rotor laminated steel plate; a permanent magnet that is located inside the rotor laminated steel plate to form a plurality of magnetic poles along the circumferential direction with the rotation axis as the center; rotor end plates that are arranged on both end surfaces of the rotor laminated steel plate, respectively, to restrict the movement of the permanent magnet in the axial direction; and balance weights that are provided on the outer surfaces of the rotor end plates, respectively. The rotor laminated steel plate and the rotor end plates are provided with at least three axial through holes that are equally spaced apart in the circumferential direction. The rotor laminated steel plate and the rotor end plates are fixed by three rivets passing through the axial through holes, respectively. The balance weight on one side is fixed to the rotor end plate on the one side by two of the three rivets. The balance weight on the other side is fixed to the rotor end plate on the other side by remaining one of the rivets, and is positioned with respect to the rotor end plate on the other side by engagement members provided to the balance weight on the other side and the rotor end plate on the other side.

According to the invention set forth in claim 2, in the rotor of a compressor motor of claim 1, the engagement members include either a protrusion, or a recess or a through hole provided to the balance weight, and either a recess or a through hole, or a protrusion provided to the rotor end plate. By the engagement between the protrusion of the balance weight and the recess or the through hole of the rotor end plate, or between the recess or the through hole of the balance weight and the protrusion of the rotor end plate, the balance weight is positioned with respect to the rotor end plate.

Effect of the Invention

According to the present invention, a rotor of a compressor motor includes: a rotor laminated steel plate; a permanent magnet that is located inside the rotor laminated steel plate to form a plurality of magnetic poles along the circumferential direction with the rotation axis as the center; rotor end plates that are arranged on both end surfaces of the rotor laminated steel plate, respectively, to restrict the movement of the permanent magnet in the axial direction; and balance weights that are provided on the outer surfaces of the rotor end plates, respectively. The rotor laminated steel plate and the rotor end plates are provided with at least three axial through holes that are equally spaced apart in the circumferential direction. The rotor laminated steel plate and the rotor end plates are fixed by three rivets passing through the axial through holes, respectively. The balance weight on one side is fixed to the rotor end plate on the one side by two of the three rivets. The balance weight on the other side is fixed to the rotor end plate on the other side by remaining one of the rivets, and is positioned with respect to the rotor end plate on the other side by engagement members provided to the balance weight on the other side and the rotor end plate on the other side.

With this, to fix the balance weight to the rotor with a single rivet, the balance weight can be stably positioned with respect to the rotor without using a positioning jig or the like. Moreover, according to the present invention, there is no need to make the balance weight large in size or in a specific shape such as a cylindrical shape to achieve a predetermined centrifugal force, and thereby the rotor can be obtained at a low cost. Furthermore, the positioning by the engagement members prevents the balance weight from rotating about the rivet while the rotor is being driven to rotate.

EXPLANATIONS OF LETTERS OR NUMERALS

Figure 1:
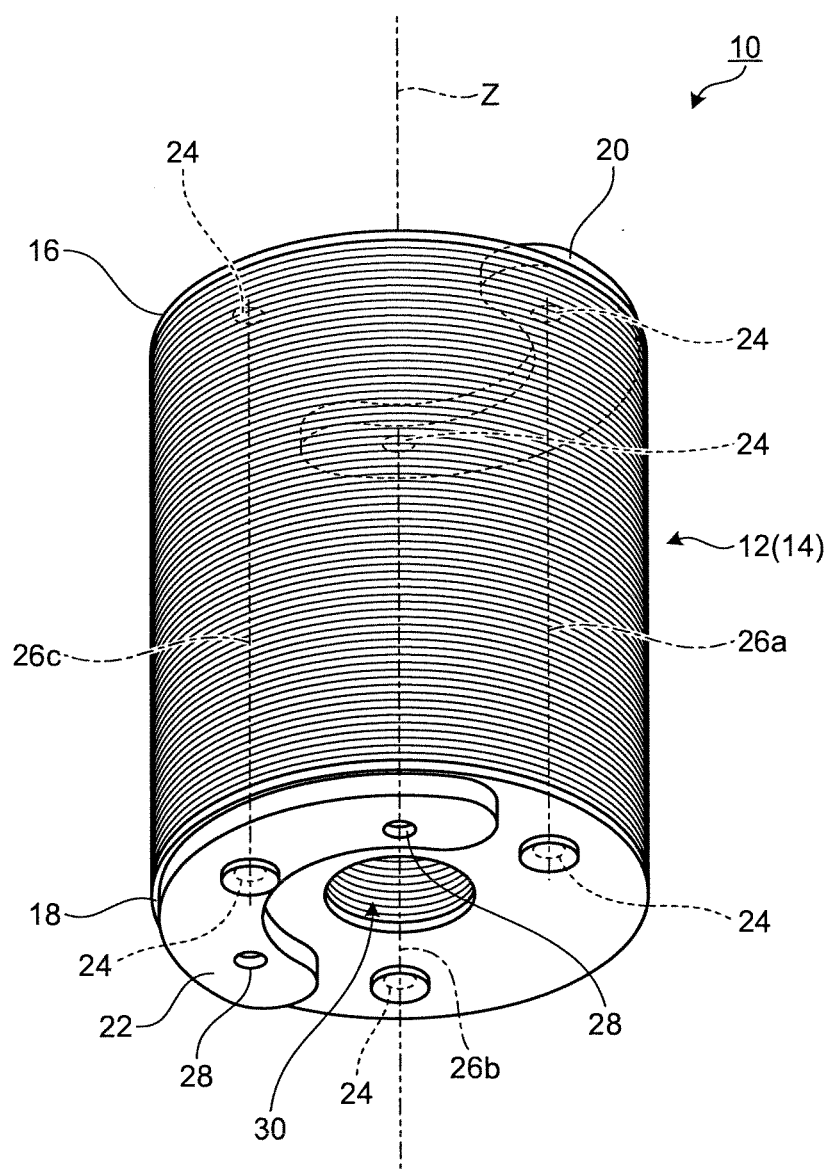
FIG. 1 is a perspective view of a rotor of a compressor motor according to an embodiment of the present invention.

10 Rotor (rotor of a compressor motor)
12 Rotor laminated steel plate
14 Permanent magnet
16, 18 Rotor end plate
20 Balance weight (balance weight on one side)
22 Balance weight (balance weight on the other side)
24 Axial through hole
26a, 26b, 26c Rivet
28 Protrusion (engagement member)
30 Shaft hole
32 Recess (engagement member)
40 Compression mechanism
42 Motor
44 Sealed casing
46 Stator
48 Shaft
50a, 50b Eccentric crank
52a, 52b Cylinder
54a, 54b Piston
100 Compressor

BEST MODE(S) FOR CARRYING OUT THE INVENTION

Exemplary embodiments of a rotor of a compressor motor according to the present invention will be described in detail below with reference to the accompanying drawings taking a 6-pole rotor as an example. However, the present invention is not limited to the following embodiments.

Embodiment

Figure 2:
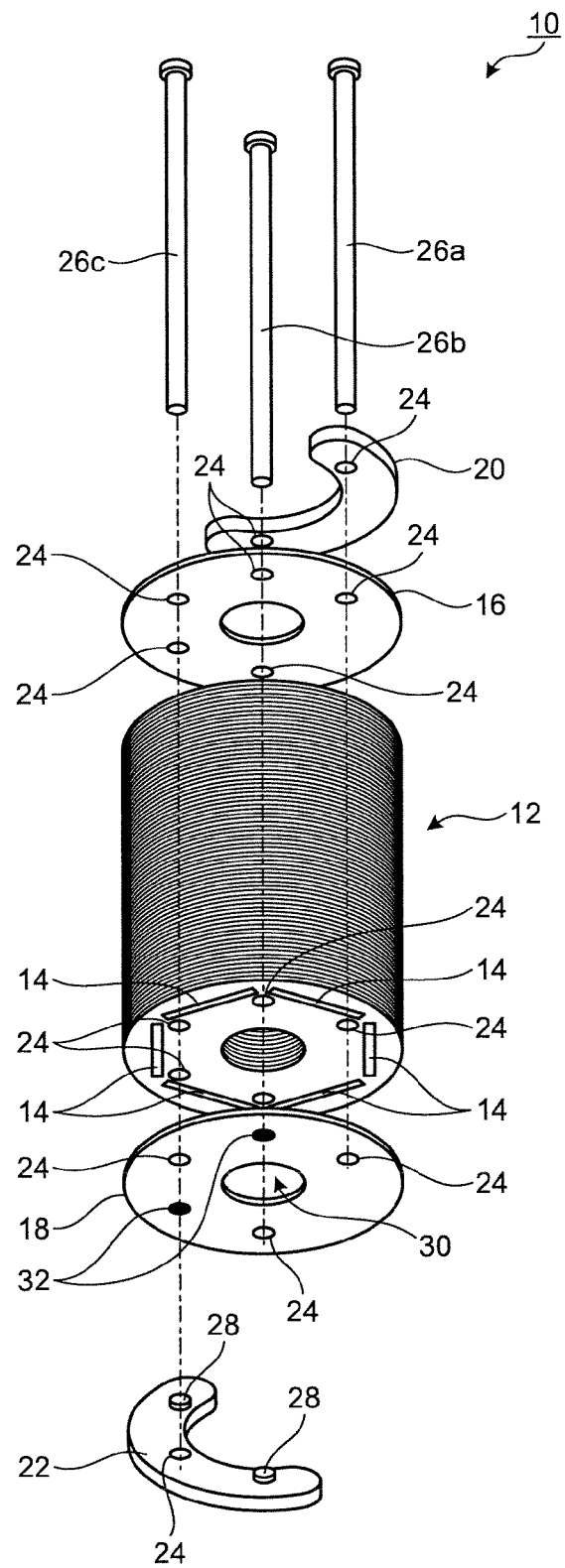
FIG. 2 is an exploded perspective view of the rotor of a compressor motor according to the embodiment of the present invention.

As illustrated in FIGS. 1 and 2, a rotor 10 of a compressor motor of the present invention is a rotor of a motor for use in a compressor. The rotor 10 includes a substantially cylindrical rotor laminated steel plate 12 having a shaft hole 30 and a permanent magnet 14 located inside the rotor laminated steel plate 12 to form six magnetic poles in a manner such that south and north poles are alternately arranged along the circumferential direction with a rotation axis Z as the center.

The rotor 10 further includes perforated disc-like rotor end plates 16 and 18 that are concentrically arranged on both end surfaces of the rotor laminated steel plate 12, respectively, to restrict the movement of the permanent magnet 14 in the axial direction, and arched plate-like balance weights 20 and 22 provided on the outer surfaces of the rotor end plates 16 and 18, respectively. The balance weights 20 and 22 counteract centrifugal force acting on the eccentrically rotating part of the compression mechanism (not illustrated) to ensure the balance of the entire compressor. The balance weights 20 and 22 are located at positions having a phase difference of 180° with respect to the rotation axis Z.

The rotor laminated steel plate 12 and the rotor end plates 16 and 18 are provided with three axial through holes 24 that are equally spaced apart (spaced 120° apart) in the circumferential direction. The axial through holes 24 are located at positions not interfering with the permanent magnet 14. The number of the axial through holes 24 may be three or more and, as illustrated in FIG. 2, there may be five of them.

The rotor laminated steel plate 12 and the rotor end plates 16 and 18 are fixed by three rivets 26a, 26b, and 26c passing through the axial through holes 24, respectively.

The balance weight 20 on one side is fixed to the rotor end plate 16 on the one side by the two rivets 26a and 26b of the three rivets.

At two end positions of the balance weight 22 on the other side, protrusions 28 are formed as engagement members by press molding or the like. In the rotor end plate 18 on the other side, recesses 32 are formed at two positions facing the protrusions 28. The recesses 32 may be through holes passing through the rotor end plate 18 as well as recesses formed by press molding or the like.

The balance weight 22 on the other side is fixed to the rotor end plate 18 on the other side by the remaining one rivet 26c, and is positioned with respect to the rotor end plate 18 on the other side by the engagement of the protrusions 28 with the recesses 32.

As described above, the balance weight 22 on the other side is provided with the protrusions 28 by press molding, while the rotor end plate 18 is provided with the recesses 32. By the engagement between the protrusions 28 and the recesses 32, the balance weight 22 on the other side can be positioned with respect to the rotor end plate 18, and is prevented from rotating about the rivet 26c. Accordingly, to fix the balance weight 22 to the rotor 10 with the single rivet 26c, the balance weight 22 can be stably positioned with respect to the rotor 10 without using a positioning jig or the like. Moreover, there is no need to make the balance weight large in size or in a specific shape such as a cylindrical shape to achieve a predetermined centrifugal force, and thereby the rotor can be obtained at a low cost. Furthermore, the positioning by the engagement of the protrusions 28 with the recesses 32 prevents the balance weight 22 from rotating about the rivet 26c while the rotor is being driven to rotate.

Figure 3:
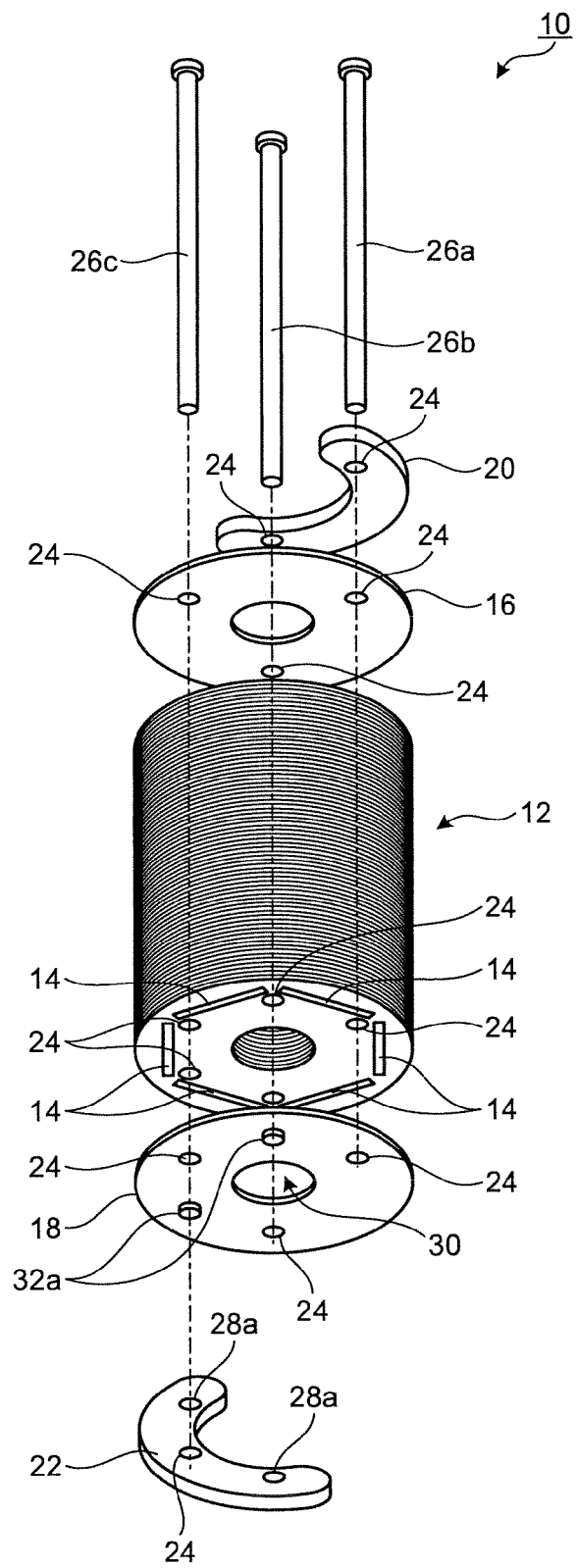
FIG. 3 is an exploded perspective view of a rotor of a compressor motor according to another embodiment of the present invention.

As illustrated in FIG. 3, the recesses and the protrusions may exchange their positions. For example, the balance weight 22 may be provided with recesses 28a, and the rotor end plate 18 may be provided with protrusions 32a so that the balance weight 22 can be positioned by the engagement between the recesses 28a and the protrusions 32a. In this case, the balance weight 22 may be provided with through holes instead of the recesses 28a With reference to FIG. 4, a description will be given of the case where the rotor 10 of a compressor motor of the present invention is applied to a 2-cylinder rotary compressor.

Figure 4:
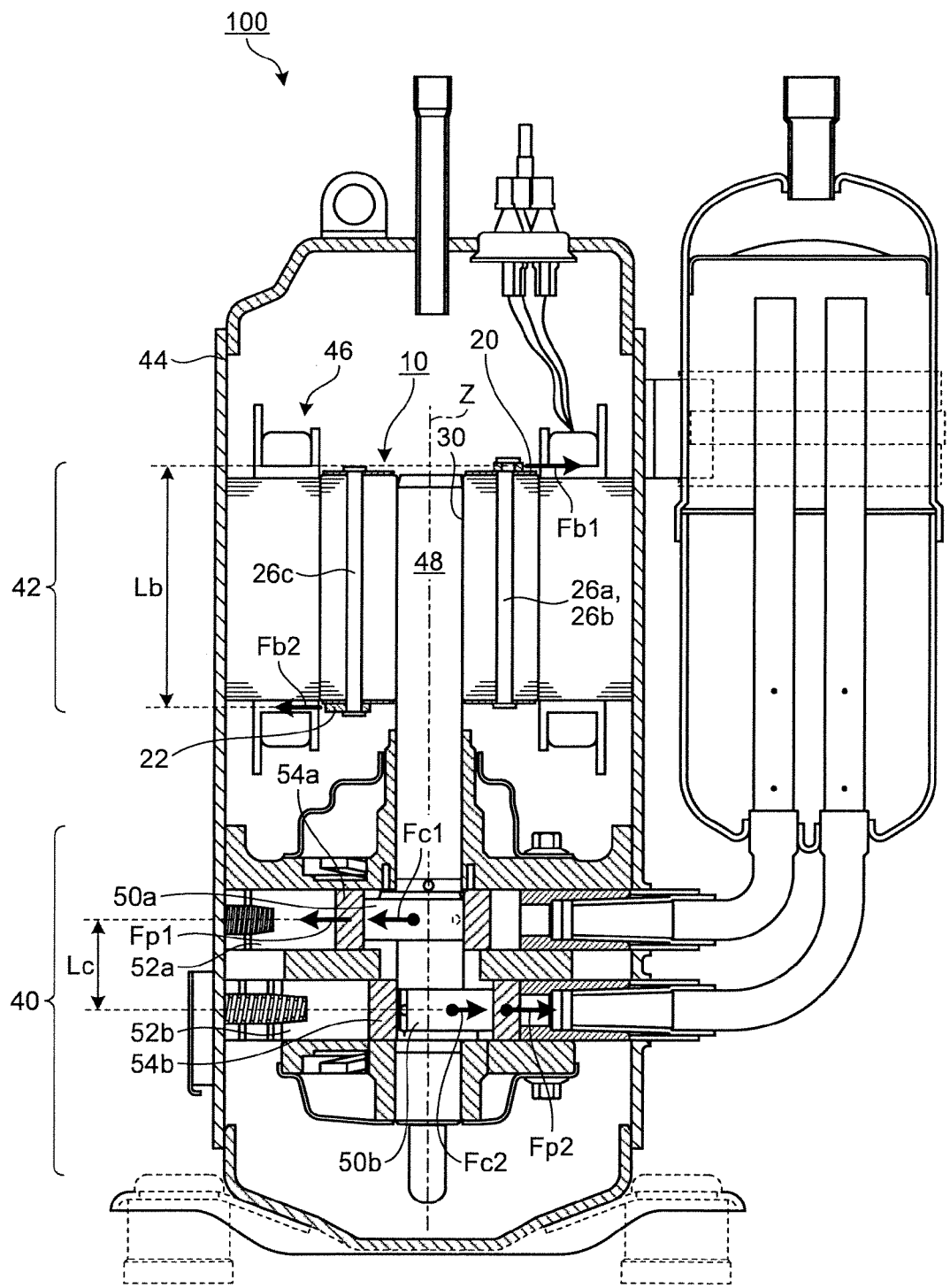
FIG. 4 is a side cross-sectional view of a compressor using the rotor of a compressor motor of the present invention.
Figure 5:
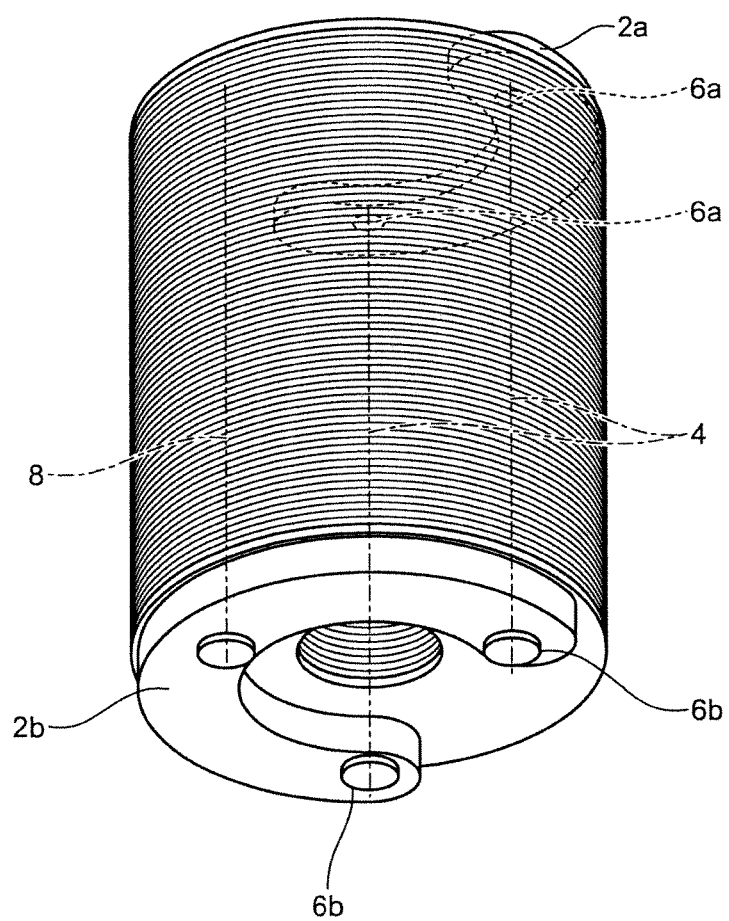
FIG. 5 is a perspective view of an example of a conventional rotor of a compressor motor.
Figure 6:
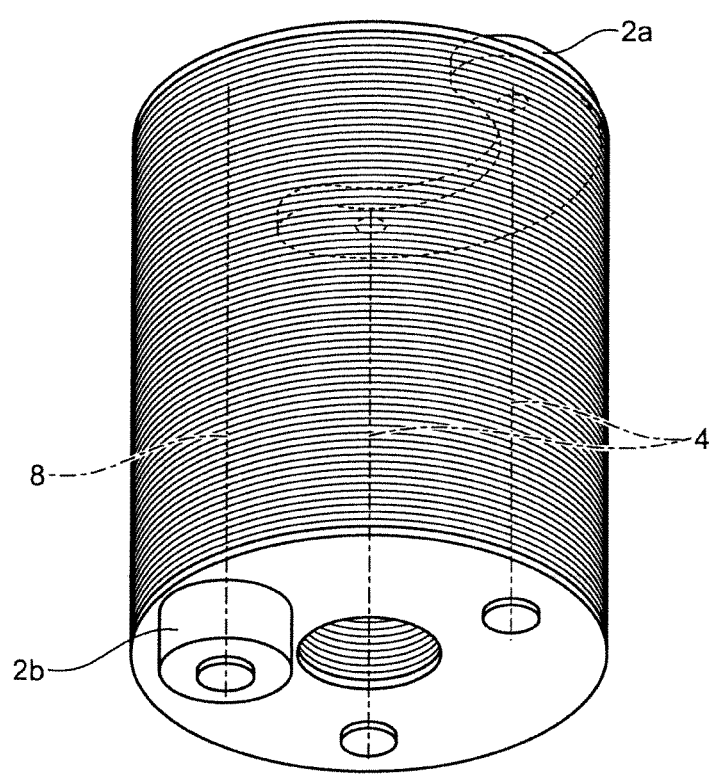
FIG. 6 is a perspective view of another example of a conventional rotor of a compressor motor.

As illustrated in FIG. 4, a 2-cylinder rotary compressor 100 includes a compression mechanism 40 that generates compressed fluid and a motor 42 that drives the compression mechanism 40. The motor 42 includes a stator 46 fixed in a sealed casing 44 and the rotor 10 of the present invention. To the shaft hole 30 of the rotor 10 is fixed a shaft 48 that extends downward toward the compression mechanism 40. Below the shaft 48 are eccentric cranks 50a and 50b of the compression mechanism 40.

The compression mechanism 40 includes two cylinders 52a and 52b that are arranged vertically. The eccentric cranks 50a and 50b are located inside the cylinders 52a and 52b, respectively. The eccentric cranks 50a and 50b are fitted with ring-like pistons 54a and 54b, respectively.

When the shaft 48 of the rotor 10 is driven by the motor 42 and rotates, centrifugal forces Fc1 and Fc2 act on the eccentric cranks 50a and 50b, respectively, while centrifugal forces Fp1 and Fp2 act on the pistons 54a and 54b, respectively.

Meanwhile, centrifugal forces Fb1 and Fb2 act on the balance weights 20 and 22 fixed above and below the rotor 10 of the motor 42, respectively.

To ensure the balance of the entire compressor, positions and masses of the two balance weights 20 and 22 are determined in advance to satisfy the following expressions (1) and (2):

$$(Fc1+Fp1)+Fb2 \approx (Fc2+Fp2)+Fb1 \qquad (1)$$

$$(Fc1+Fp1+Fc2+Fp2) \times Lc \approx (Fb1+Fb2) \times Lb \qquad (2)$$

where Lc is an axial direction distance between the points of action of the centrifugal forces Fc1 and Fc2 and also is an axial direction distance between the points of action of the centrifugal forces Fp1 and Fp2, and Lb is an axial direction distance between the points of action of the centrifugal forces Fb1 and Fb2.

As described above, according to the present invention, a rotor of a compressor motor includes a rotor laminated steel plate, a permanent magnet located inside the rotor laminated steel plate to form a plurality of magnetic poles along the circumferential direction with the rotation axis as the center, rotor end plates arranged on both end surfaces of the rotor laminated steel plate to restrict the movement of the permanent magnet in the axial direction, and balance weights provided on the outer surfaces of the rotor end plates, respectively. The rotor laminated steel plate and the rotor end plates are provided with at least three axial through holes that are equally spaced apart in the circumferential direction. The rotor laminated steel plate and the rotor end plates are fixed by three rivets passing through the axial through holes, respectively. The balance weight on one side is fixed to the rotor end plate on the one side by two of the three rivets. The balance weight on the other side is fixed to the rotor end plate on the other side by remaining one of the rivets. The balance weight on the other side is positioned with respect to the rotor end plate on the other side by engagement members provided thereto and those provided to the rotor end plate on the other side.

With this, to fix the balance weight to the rotor with a single rivet, the balance weight can be stably positioned with respect to the rotor without using a positioning jig or the like. Moreover, according to the present invention, there is no need to make the balance weight large in size or in a specific shape such as a cylindrical shape to achieve a predetermined centrifugal force, and thereby the rotor can be obtained at a low cost. Furthermore, the positioning by the engagement members prevents the balance weight from rotating about the rivet while the rotor is being driven to rotate.

INDUSTRIAL APPLICABILITY

As described above, a rotor of a compressor motor and the way of fixing its balance weight according to the present invention are suitably applied to a rotor of a compressor motor used in rotary compressors such as scroll compressors, and especially suitable to manufacture a rotor with six magnetic poles at a low cost.

The invention claimed is:

1. A rotor of a compressor motor comprising:
   a rotor laminated steel plate;
   a permanent magnet that is located inside the rotor laminated steel plate to form a plurality of magnetic poles along a circumferential direction with a rotation axis as a center;
   first and second rotor end plates that are arranged on both end surfaces of the rotor laminated steel plate, respectively, to restrict movement of the permanent magnet in an axial direction; and
   first and second balance weights that are provided on outer surfaces of the first and second rotor end plates, respectively, and have arched plate shape, wherein
   the rotor laminated steel plate and the first and second rotor end plates are provided with at least five axial through holes that are spaced apart in the circumferential direction,
   the rotor laminated steel plate and the rotor end plates are fixed by three rivets passing through three of the axial through holes, respectively,
   the three of the axial through holes are spaced 120° apart in the circumferential direction,
   the first balance weight is fixed to the first rotor end plate by two of the three rivets,
   the second balance weight is fixed to the second rotor end plate by remaining one of the rivets, and is positioned with respect to the second rotor end plate by engagement members provided to the second balance weight and the second rotor end plate,
   the engagement members include:
      protrusions provided at two end positions of the second balance weight; and
      remaining two of the axial through holes except the three of the axial through holes,
   by engagement between the protrusions and the remaining two of the axial through holes the second balance weight is positioned with respect to the second rotor end plate, and
   the remaining two of the axial through holes are adjacent to an axial through hole through which the remaining one of the rivets passes.

* * * * *